United States Patent [19]

Dietrich et al.

[11] Patent Number: 5,705,025
[45] Date of Patent: Jan. 6, 1998

[54] METHOD FOR DRY ETCHING OF A SEMICONDUCTOR SUBSTRATE

[75] Inventors: Ralf Dietrich; Gerhard Franz, both of München, Germany

[73] Assignee: Siemens Aktiengesellschaft, Munich, Germany

[21] Appl. No.: 539,198

[22] Filed: Oct. 4, 1995

[30] Foreign Application Priority Data

Oct. 4, 1994 [DE] Germany ............... 44 35 459.2

[51] Int. Cl.⁶ ............... G02B 3/00; H01L 21/00
[52] U.S. Cl. ............... 156/643.1; 156/646.1; 156/659.1; 156/662.1; 437/228
[58] Field of Search ............... 216/2, 26, 49, 216/67, 24; 156/643.1, 646.1, 662.1, 659.1; 437/228

[56] References Cited

U.S. PATENT DOCUMENTS

| 4,875,750 | 10/1989 | Spaeth et al. ............... 385/35 |
| 4,886,569 | 12/1989 | Ohja et al. ............... 156/662.1 X |
| 5,066,090 | 11/1991 | Mayerhofer et al. ............... 385/35 |
| 5,255,333 | 10/1993 | Altheus et al. ............... 385/33 |
| 5,286,338 | 2/1994 | Feldblum et al. ............... 216/26 |
| 5,296,094 | 3/1994 | Shan et al. ............... 437/225 X |
| 5,316,640 | 5/1994 | Wakabayashi et al. ............... 216/26 X |
| 5,346,583 | 9/1994 | Basavanhally ............... 216/26 |
| 5,370,768 | 12/1994 | Mersereau et al. ............... 216/26 |

FOREIGN PATENT DOCUMENTS

| 0280305 | 8/1988 | European Pat. Off. . |
| 0412184 | 2/1991 | European Pat. Off. . |
| 0 421 118 A1 | 4/1991 | European Pat. Off. . |
| 0421118 | 4/1991 | European Pat. Off. . |
| 60053073 | 3/1985 | Japan . |
| 90/01805 | 2/1990 | WIPO . |

Primary Examiner—Thi Dang
Attorney, Agent, or Firm—Herbert L. Lerner; Laurence A. Greenberg

[57] ABSTRACT

A method for dry etching of a semiconductor substrate includes producing convex structures on a surface of a semiconductor wafer by using a suitable masking and a suitable etchant. A thick photoresist layer is applied to a semiconductor wafer and structured. The structured photoresist layer is liquified by the influence of temperature to produce a spherical structure and is then hardened as an etchable masking. The semiconductor wafer structured with the photoresist layer is etched in plasma at etching speeds being similar for the semiconductor material and the photoresist, for transferring a convex structure of the photoresist layer to the semiconductor wafer, during etching down of the photoresist layer.

8 Claims, 1 Drawing Sheet

METHOD FOR DRY ETCHING OF A SEMICONDUCTOR SUBSTRATE

BACKGROUND OF THE INVENTION

1. Field of the Invention

The invention relates to a method for dry etching of a semiconductor substrate, in which convex structures are produced on the surface of a semiconductor wafer by using a suitable masking and a suitable etchant.

In fiber optics technology, transmitting and receiving components are used that convert electrical signals into light, couple light into a glass fiber or out of a glass fiber and convert it into electrical signals. Optoelectronic converters of that kind, which are equipped with a lens coupling technology, are known and are described, for instance, in European Patent Applications EP-A 412 184 and EP-A 421 118. Coupling the light into or out of the fiber requires microlens systems, which focus the divergent beams of light. The individual components must be adjusted to one another to an accuracy of a few micrometers. If discrete lenses of glass, sapphire or silicon are used, then high-precision mounts are needed, which in turn must be adjusted and secured, between the active component and the optical waveguides, in such a way that even after years of heavy loads, no shifting or maladjustments occur.

In an optoelectronic coupling element which is known from European Patent Application EP-A 280 305, discrete spherical lenses of various materials, which are secured in high-precision silicon mounts, are used for coupling in the light. However, the lenses must be placed in individual holes and sealed in place. At the high sealing-in temperatures, strains can arise between the individual components as a result of differing coefficients of expansion, so that cracks can occur in the lenses or in the silicon holder in the course of cooling. Both the unequipped silicon wafers and the silicon wafers equipped with lenses are three-dimensionally structured to a considerable extent, so that the otherwise conventional planar semiconductor processes can only be employed with difficulty, if at all. An improvement could be attained by using discrete spherical silicon lenses, because then when silicon holders are also used thermal strains do not arise. Moreover, those lenses allow greater mounting tolerances upon adjustment between the active optical component and the optical waveguide or glass fibers. However, those lenses are relatively expensive and because of the optical demands made on them they must be ground down at great effort after they have been sealed in.

A marked simplification of known coupling optics can be attained if the active components are equipped with integrated microlenses. Since they require less adjustment effort and allow greater mounting tolerances, those systems are more economical than imaging optics with individual lenses. In the case of wavelengths >1.1 µm, for instance, silicon can be used as the lens material. Due to the high index of refraction, plane-convex lenses with a relatively long radius can be used. The loses from spherical aberration, for instance, are markedly less in comparison with glass or sapphire lenses. However, until now, it was not possible to produce structures of silicon with spherical curvatures having the desired order of magnitude.

SUMMARY OF THE INVENTION

It is accordingly an object of the invention to provide a method for dry etching of a semiconductor substrate, which overcomes the hereinafore-mentioned disadvantages of the heretofore-known methods of this general type and with which it is possible to produce convex monolithic lens systems that in particular can be used in fiber optics.

With the foregoing and other objects in view there is provided, in accordance with the invention, in a method for dry etching of a semiconductor substrate, which includes producing convex structures on a surface of a semiconductor wafer by using a suitable masking and a suitable etchant, the improvement which comprises applying a thick photoresist layer to a semiconductor wafer; structuring the photoresist layer; liquifying the structured photoresist layer by the influence of temperature to produce a spherical structure and then hardening the spherical structure as an etchable masking; and etching the semiconductor wafer structured with the photoresist layer in plasma at etching speeds being similar for the semiconductor material and the photoresist, for transferring a convex structure of the photoresist layer to the semiconductor wafer, during etching down of the photoresist layer.

In accordance with another mode of the invention, there is provided a method which comprises applying the photoresist layer to a semiconductor material selected from the group consisting of silicon and III/V semiconductor material.

In accordance with a further mode of the invention, there is provided a method which comprises applying the photoresist layer to the semiconductor wafer in a thickness of approximately 10 µm to 60 µm.

In accordance with an added mode of the invention, there is provided a method which comprises etching with gas mixtures of $SF_6$, $O_2$, He and $CHF_3$.

In accordance with an additional mode of the invention, there is provided a method which comprises applying a dielectric antireflective layer to the semiconductor wafer having the convex structure.

In accordance with yet another mode of the invention, there is provided a method which comprises applying and structuring a metallizing layer and a solderable securing layer on a back side of the semiconductor wafer.

In accordance with a concomitant mode of the invention, there is provided a method which comprises producing the convex structures in the semiconductor wafer, applying the antireflective layer and structuring the metallizing layer with the solderable securing layer in a wafer package; and subsequently effecting separation.

The advantages attained with the invention are in particular that with the method of the invention it is no longer necessary to secure a discrete lens on a substrate that is made, for instance, of silicon. Instead, the requisite lens geometry is etched directly out of a wafer that is preferably made of silicon. The hybrid structure of a coupling lens is accordingly replaced with a monolithic integrated lens.

Other features which are considered as characteristic for the invention are set forth in the appended claims.

Although the invention is illustrated and described herein as embodied in a method for dry etching of a semiconductor substrate, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
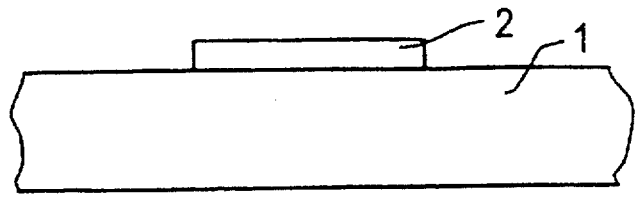
FIGS. 1–5 are fragmentary, diagrammatic, cross-sectional views showing various method steps of a preferred exemplary embodiment of the invention.
Figure 2:
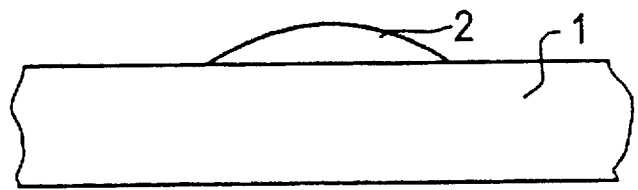
Figure 3:
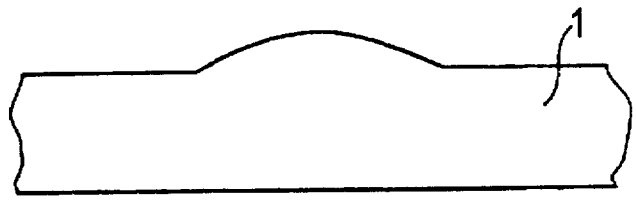

Referring now to the figures of the drawing in detail and first, particularly, to FIG. 1 thereof, it is seen that a very thick photoresist layer 2 is first applied on a semiconductor wafer 1. Suitable materials for the semiconductor are III–V bonding semiconductors, such as GaP and InP, but also Ge. Silicon is preferably used. The thickness of the resist layer 2 can suitably be between approximately 10 μm and 60 μm. The photoresist layer 2 is accordingly thicker by multiple times than is otherwise usual in semiconductor technology. The resist layer is then structured in such a way as to form resist cylinders through the use of photolithography. The resist cylinders are liquefied through the use of heat treatment, in which the temperature must be far above the normal baking temperature of the photoresist. As a result of surface tension spherical domes form as is seen in FIG. 2, which are then cured in the course of the process. Semiconductor material, preferably silicon, and the photoresist layer 2, are etched at a certain etching ratio to one another in a plasma, the resist dome is transferred to the semiconductor wafer 1 and the photoresist layer 2 is removed or etched away at the same time, as is seen in FIG. 3. The etching ratio is suitably usually 1:1. In other words, the etching speeds for the semiconductor material and the photoresist are similar or virtually identical.

Mixtures of $SF_6$, $O_2$, He and $CHF_3$ are preferably used as etching gases for the dry etching process. A gas mixture of $SF_6$ and $O_2$ has proved advantageous for etching a semiconductor wafer 1 made of silicon. Since the available surfaces of semiconductor material and photoresist vary relative to one another during the etching process, the etching speeds of semiconductor material and photoresist vary relative to one another as well, so that the photoresist dome is increasingly less precisely copied. However, this effect can be compensated for with the aid of the gas composition, the pressure, and the coupled-in power in the plasma. In other words, during the process, the etching parameters must be continuously readapted to existing conditions. As a result of these variations and thus of the influence of the etching rate ratio of the semiconductor material to the photoresist, aspherical lens systems can also be produced, which have a higher aperture number and thus make a higher coupling efficiency possible. This means that even beams having axes which are remote can be gathered.

Figure 4:
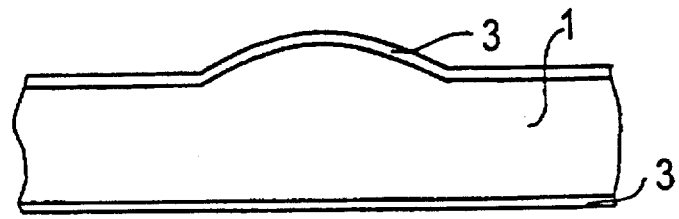

In FIG. 4, the semiconductor wafer 1 which is provided with the convex structures, can be coated with an antireflection layer 3 as a dielectric lumenizing layer. In the case in which a semiconductor wafer 1 of silicon is used, the wafer 1 is coated with an $Si_3N_4$ layer as the antireflection layer 3, which is applied in the plasma process.

Figure 5:
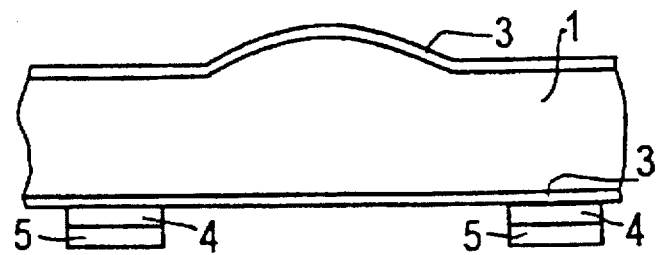

In order to enable the lens system to be secured reliably between an optical transmitter in the form of a semiconductor chip, for instance a laser chip, and an optical waveguide in the form of a glass fiber, a metallizing layer 4 in the form of metal contacts and a solderable securing layer 5 as the securing solder are applied. Both of the layers 4, 5 are applied to the back side of the semiconductor wafer 1 and structured accordingly as is seen in FIG. 5. In the case in which silicon is used for the semiconductor wafer 1, a Ti/Pt/Au order of layers is preferred, and AuSn in a ratio of 80:20 is preferred as the solder. Both layers 4, 5 are vapor deposited and are structured photolithographically.

The production of the convex structures in the semiconductor wafer 1, the application of the antireflection layer 3, and the structuring of the metallizing layer 4 with the solderable securing layer 5 are advantageously carried out in the wafer package, and only then is the wafer separated into the convex lenses.

We claim:

1. In a method for dry etching of a semiconductor substrate, which includes producing a convex structure on a surface of a semiconductor wafer by using a suitable mask and a suitable etchant, the improvement which comprises:

applying a thick photoresist layer to a semiconductor wafer;

structuring the photoresist layer;

liquefying the structured photoresist layer by the influence of temperature to produce a spherical structure and then hardening the spherical structure as an etchable masking;

etching the semiconductor wafer structured with the photoresist layer in plasma at etching speeds being similar for the semiconductor material and the photoresist, for transferring a convex structure of the photoresist layer to the semiconductor wafer, during etching down of the photoresist layer; and applying a dielectric antireflective layer to the semiconductor wafer having the convex structure, whereby the antireflective layer covers the convex structure of the semiconductor wafer.

2. The method according to claim 1, which comprises applying the photoresist layer to a semiconductor material selected from the group consisting of silicon and III/V semiconductor material.

3. The method according to claim 1, which comprises applying the photoresist layer to the semiconductor wafer in a thickness of approximately 10 μm to 60 μm.

4. The method according to claim 1, which comprises etching with a gas selected from the group consisting of $SF_6$, $O_2$, He and $CHF_3$ being used as etching gases.

5. The method according to claim 1, which comprises, subsequently to the step of applying the dielectric antireflective layer, applying and structuring a metallizing layer and a solderable securing layer on a back side of the semiconductor wafer.

6. The method according to claim 5, which comprises:

carrying out the steps of producing the convex structure in the semiconductor wafer, applying a dielectric antireflective layer to the semiconductor wafer having the convex structure, and applying and structuring a metallizing layer and a solderable securing layer on a back side of the semiconductor wafer for wafers of a wafer package.

7. The method according to claim 6, which comprises separating the wafers of the wafer package.

8. The method according to claim 6, which comprises separating the wafers of the wafer package, into wafers each having one convex structure.

* * * * *